Figure 1:
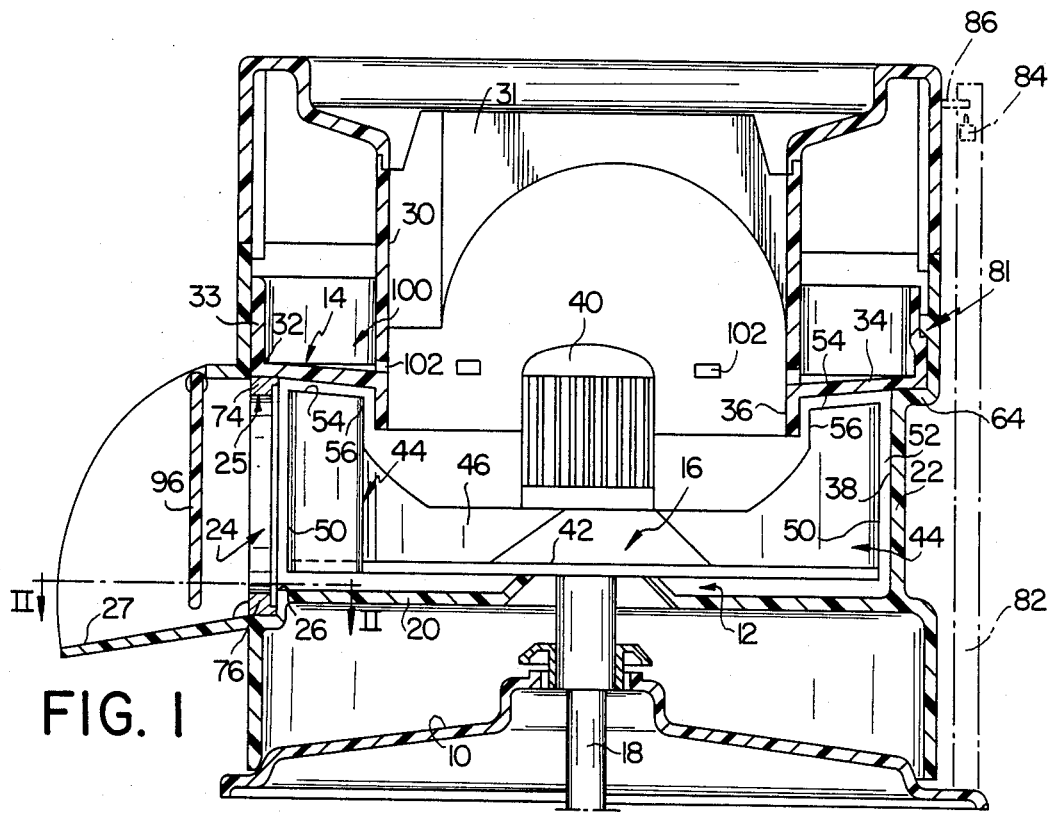

United States Patent [19]

Amiot et al.

[11] Patent Number: 4,852,814
[45] Date of Patent: Aug. 1, 1989

[54] APPARATUS FOR GRINDING AND STRAINING FOOD PRODUCTS, SUCH AS FRUITS OR VEGETABLES

[76] Inventors: Jacques H. J. Amiot; Jacky R. P. Fourny, both c/o Societe Moulinex, 25, route de Mamers, 61000 Alencon; Gilles J. M. Letournel; Vital A. Parise, both c/o Societe Moulinex, 2, rue de l'Industrie, Cormelles-Le-Royal 14123-IFS, all of France

[21] Appl. No.: 213,673

[22] Filed: Jun. 30, 1988

[30] Foreign Application Priority Data

Jul. 1, 1987 [FR] France ................. 87 09325

[51] Int. Cl.$^4$ ............................................. A47J 43/46
[52] U.S. Cl. ..................................... 241/37.5; 241/73; 241/86.1; 241/89.3; 241/282.2
[58] Field of Search .............. 241/73, 243, 242, 282.1, 241/282.2, 235, 36, 37.5, 275, 86.1, 89.3, 88

[56] References Cited

U.S. PATENT DOCUMENTS 2,811,996 11/1957 Castellanos ................. 241/73 X
2,886,254 5/1959 Rohlinger et al. ............. 241/86.1 X
3,090,568 5/1963 Wetmore ..................... 241/73

FOREIGN PATENT DOCUMENTS 1047588 12/1958 Fed. Rep. of Germany ........ 241/73

Primary Examiner—Mark Rosenbaum
Attorney, Agent, or Firm—Young & Thompson

[57] ABSTRACT

Apparatus for grinding and straining food products such as fruits or vegetables so as to reduce them to a puree, comprises a working receptacle having a bottom wall and a side wall which are figures of rotation having a vertical axis. A sieve is provided, through which the interior of the receptacle communicates with the exterior. A mashing tool is secured for rotation to a rotatable shaft disposed on that vertical axis and is driven by a motor unit, the mashing tool comprising at least one blade having a frontal attack surface so as to form with the internal surface of the side wall, at least in the region of the end of the frontal surface and substantially over all the height of the sieve, a corner at an acute angle which opens in the direction of rotation. The receptacle further has a counter-wall which is removably mounted on the side wall and transversely to the vertical axis, and which is disposed above the blade, adjacent the upper edge of the blade so as to leave a small gap between itself and that upper edge, the counter-wall being formed by a ring having a central opening and carrying on its inner edge a downwardly extending skirt which extends over only a portion of the height of the receptacle, so as to form a pressure crown between the skirt and the internal surface of the side wall, while the blade comprises an internal edge of which one portion extends at least the length of the skirt.

7 Claims, 3 Drawing Sheets

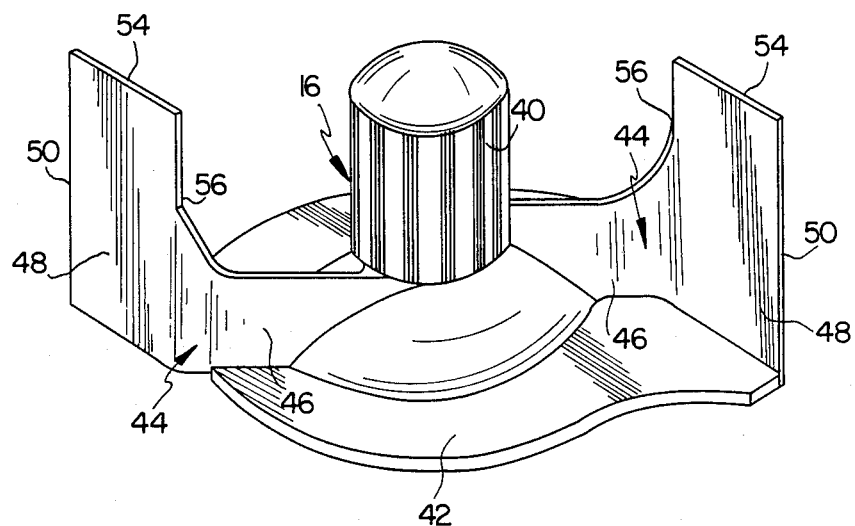
FIG. 3
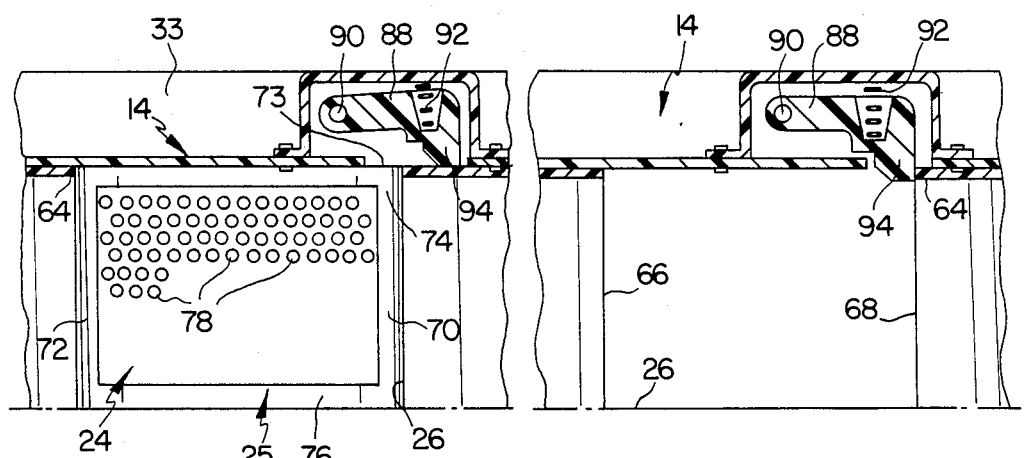
FIG. 4
FIG. 5

APPARATUS FOR GRINDING AND STRAINING FOOD PRODUCTS, SUCH AS FRUITS OR VEGETABLES

The invention relates to apparatus for grinding and straining food products, such as fruits or vegetables (cooked potatoes, for example), so as to reduce them to a puree.

The invention relates more precisely to apparatus of this type comprising a working receptacle which comprises a bottom wall and a side wall and of which one of the walls comprises a sieve through which the interior of the receptacle communicates with the outside, and which encloses a mashing tool fixed for rotation with a rotatable shaft driven by a motor unit and adapted to effect the grinding and straining of the food products through the sieve.

The invention has for an object to impart to this apparatus various modifications which improve the ease of use and operation so as not only to be able to reduce vegetables to a puree, but also to permit the grinding of berries so as to extract a liquid puree.

According to a first of these modifications, the apparatus according to the present invention is characterized in that on the one hand, the lateral wall extends along a surface of revolution having a vertical axis, said rotatable shaft is disposed on said vertical axis and the sieve is provided in the side wall, the lower edge of said sieve being located adjacent said bottom wall, and, on the other hand, the mashing tool comprises at least one blade whose forward attack face is arranged transversely to the direction of rotation between the internal surface of the side wall and the rotatable shaft, so as to form with the internal surface of the side wall, at least in its end region and substantially over all the height of the sieve, a corner at an acute angle opening in the direction of rotation, and whose free end edge extends parallel to and adjacent the internal surface of said side wall thereby leaving a small space between said edge and said internal surface.

Thanks to this arrangement, the food products contained in the receptacle are in the first instance driven in rotation and brought by centrifugal force into the angle formed between the side wall and the end of the front face of the blade so as to be thereby subjected to a cornering action, a progressive compression taking place until grinding, then, a certain quantity of the ground products is pressed against the sieve and leaves in the form of a puree. Moreover, it has been determined that in the course of grinding, particularly of berries, the clearance provided between the free edge of the blade and the side wall prevents any jamming or deformation of the blade due to hard particles such as berry seeds, which therefore permits utilizing a low power motor of reduced cost.

According to a second modification, the receptacle being provided with a removable cover and the sieve being removably mounted on the wall of the receptacle, the invention provides that the operation of the motor will be controlled by at least one switch whose action is subject to correct emplacement of the cover on the receptacle, and to this end, said cover and said sieve are mutually provided with a safety device adapted to prevent operation of the unit when the sieve is not in place.

Thus, in the absence of the sieve and/or upon mispositioning of the cover, the apparatus cannot be operated, which ensures high safety, particularly for children.

Figure 2:
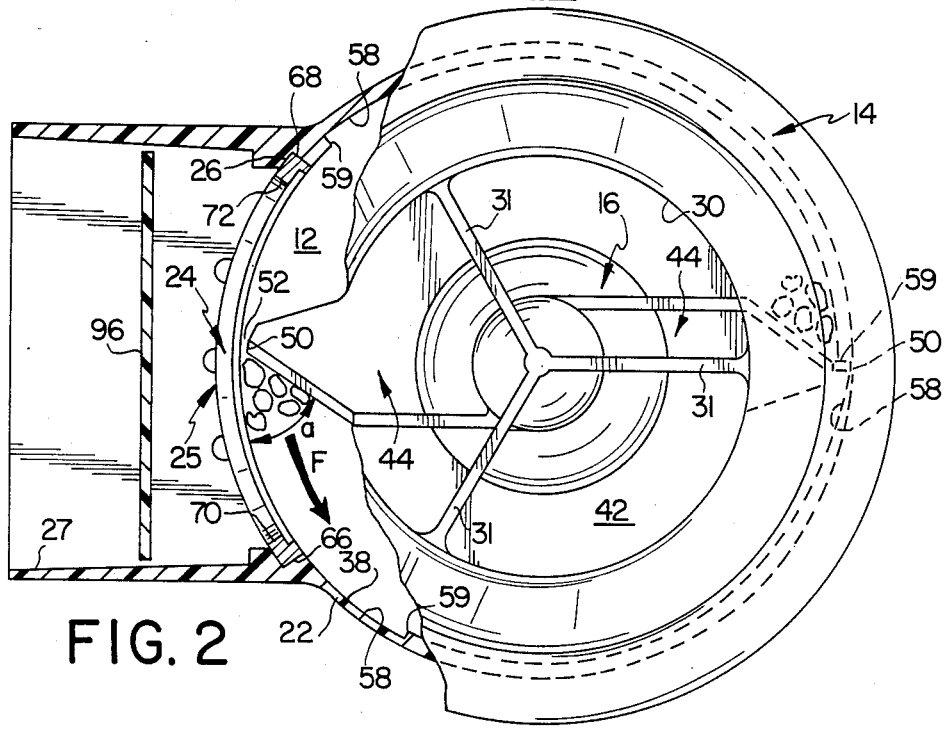
Figure 6:
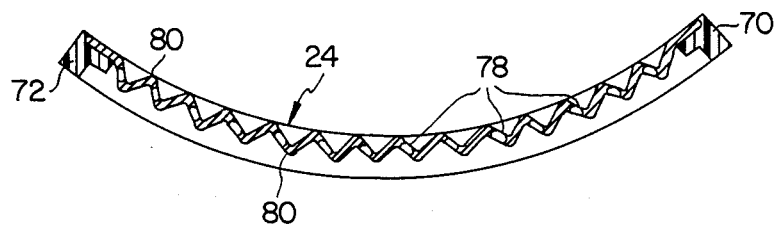
Figure 7:
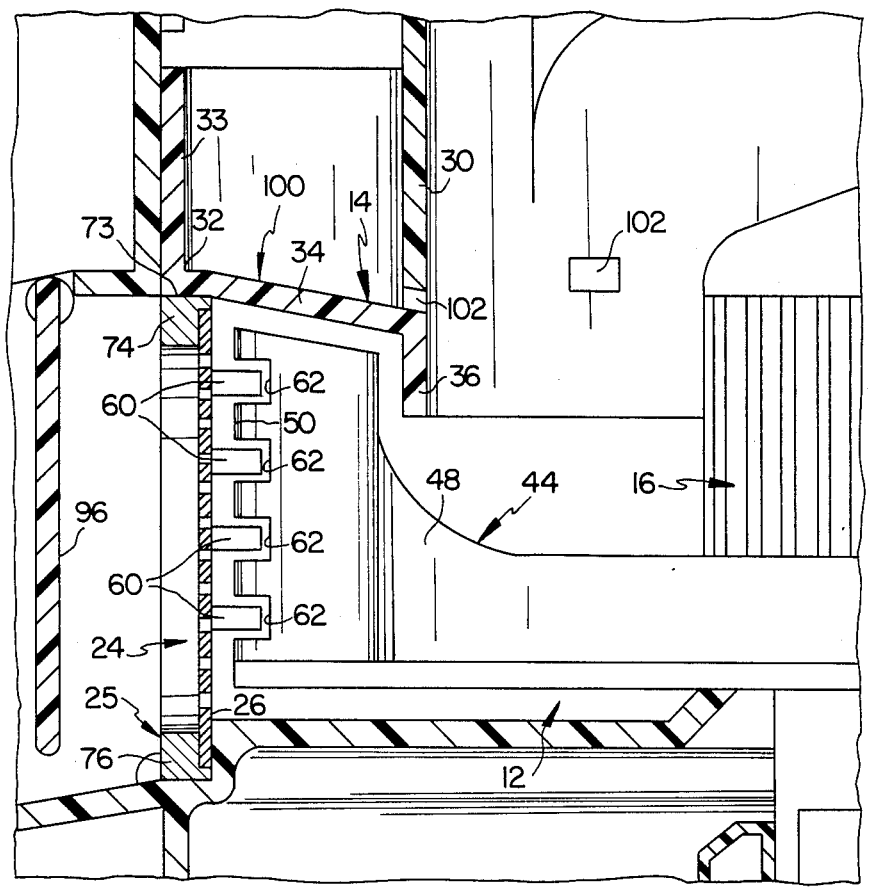

The characteristics and advantages of the invention will become more evident from the following description, by way of example, reference being had to the accompanying drawings in which:

FIG. 1 is a partial vertical cross section of an apparatus according to the invention, with the working receptacle disposed on a base and closed by a cover; FIG. 2 shows this apparatus in top plan view with the cover partially broken away and partially in section along line II—II of FIG. 1; FIG. 3 shows in perspective and on an enlarged scale the mashing tool; FIG. 4 is a partial view of a safety device of the apparatus showing the closing of the cover in the presence of the sieve; FIG. 5 is a view similar to that of FIG. 4 but without the presence of the sieve; FIG. 6 shows in horizontal cross section and on a larger scale a particular form of the screen; FIG. 7 shows in partial vertical cross section and on a larger scale a modified form of the mashing tool.

The electrical household utensil partially shown in FIG. 1 comprises a base 10 whose upper surface supports removably a working receptacle 12 which is closed by a removable cover 14 and which contains a mashing tool 16 adapted to be coupled to an output shaft 18 of a motor unit (not shown) arranged in said base. The receptacle, having the shape of a bowl, comprises a horizontal bottom wall 20 and a side wall 22 of generally cylindrical shape with a vertical axis, which comprises a sieve 24 constituted by a filter fixed in a frame 25, removably mounted in an opening 26 which is provided in this wall 22 and whose outlet is provided with a trough 27 for evacuation of the sieved products. A cover 14 comprises an inlet 30 for introduction of the food products, whose outlet opens centrally into the bowl 12, and whose entry is crossed by three protective ribs 31 adapted to prevent the introduction of the fingers of the hand of the user into the bowl 12. The cover 14 being mounted internally of the bowl 12, the peripheral edge 32 of this cover comprises an upwardly directed flange 33 adapted to be secured to the lateral wall 22, while the ring 34, formed by the transverse wall of the cover comprised between the outlet of the inlet 30 and the peripheral edge (35) of the cover 14, constitutes a counter-wall and has on the edge of the central opening, coaxially with the outlet of the inlet 30, a downwardly extending skirt 36 which extends over only a portion of the height of the bowl 12, so as to form a "pressure" crown between said skirt and the internal surface 38 of the side wall 22.

The mashing tool 16 comprises a central hub 40 coupled to the shaft 18 and connected to a flat disc 42 which has two diametrally opposed blades 44. Each blade 44 comprises an arm 46 and a vertical plate 48 whose frontal attack faces respectively extend transverse to the direction of rotation (arrow F in FIG. 2) between the internal surface 38 of the side wall (22) and the hub 40. Each plate 48 having its free end edge 50 disposed rearwardly relative to said arm, the front face of each plate forms with the internal surface 38 a corner opening in the direction of rotation (FIG. 2), this corner having substantially the form of a dihedral whose angle a is an acute angle comprised preferably between 50° and 55°. As is seen better in FIG. 1, the free end edge 50 extends parallel to the generatrix of the internal wall 22 and adjacent the internal surface 38 thereby leaving a slight gap 52 (preferably of a size of 2 mm) between said edge 50 and this surface 38. The plate 48 also has an upper edge 54 which is disposed parallel to and adjacent the counter wall 34, as well as an inner edge 56 of which a portion extends the length of the skirt 36.

Thus, thanks to the various gaps provided, on the one hand, between the free edge 50 of the plate 44 and the internal surface 38 of the bowl, and on the other hand between the upper edge 54 and inner edge 56 of said plate and the walls of the pressure crown, there is prevented during mashing any jamming of the food products and particularly seeds contained in fruits such as berries, and there is also avoided any damage to the motor unit in operation either full or empty.

So as to improve particularly the grinding of berries, it is provided that the side wall 22 of the bowl 12 has on its internal surface 38 three shallow depressions 58 whose depth increases in the direction of rotation and which thus form each a ridge 59 which extends from the bottom wall 30 upwardly according to a generatrix of the side wall so as to create a cutting effect between the free edge 50 of the blade and this ridge. According to a modification of the embodiment shown in FIG. 7, the frame 25 of the sieve 24 comprises a series of spaced teeth 60, one above the other, and directed radially inwardly projecting from the side wall, while the free edge 50 of the plate has recesses 62 complementary in shape to that of the teeth, so as to create a cutting effect between the respective edges of the teeth and the recesses.

So as to obtain excellent sieving, no matter what the food product introduced into the receptacle, the apparatus is provided with a set of sieves 24 having screens of different fineness. To permit convenient use of these different screens, the invention provides that the opening 26 of the side wall 22 is formed by a large recess which is provided in the upper edge 64 of said wall 22, and of which the two side vertical edges 66, 68 constitute respectively slideways for the lateral sides 70, 72 of the frame 25. This frame 25 has a form complementary to that of the recess, which is to say the shape of a parallelogram of curved surface such that, on the one hand, the internal surface of the screen will be situated at the same level as the internal surface 38 of the wall 22, and on the other hand, the external surface 73 of the upper side 74 of the frame 25 is located in the plane containing the upper edge 64 of the wall 22 and the side 76 of this frame extends to the level of the bottom wall 20 of the receptacle, the screen then extending in height substantially between the counter wall 34 and said bottom wall 20.

The set of sieves 24 comprises at least three types of screens each constituted of perforated sheet metal whose perforations are formed by cylindrical holes 78 disposed in diagonal formation as partially illustrated in FIG. 4, and whose "transparency", the ratio of the total surface of the holes 78 to the total surface of the screen, is between 35 and 60%.

Thus, the fine screen adapted, for example, for the preparation of fruit juices such as extracts from berries, comprises holes of a diameter of 0.8 mm and its "transparency" is of the order of 25%. The medium screen adapted, for example, for the preparation of tomato juice comprises holes of a diameter of 1.5 mm, and its "transparency" is of the order of 50%. The coarse screen adapted for example for the preparation of potato puree comprises holes of a diameter of 4 mm and its "transparency" is between 55 and 60%; and preferably, to provide a complete puree, the "transparency" is equal to 58%. According to a modified form illustrated in FIG. 6, the sieve 24 comprises a screen which has a sinusoidally undulating profile thereby providing a series of projections 80 arranged vertically not only on the internal surface but also on the external surface of the sheet.

There will now be described a safety device which is adapted to prevent the operation of the motor unit when the cover 14 and the sieve 24 are not both in place. This device is more particularly adapted for an apparatus whose cover 14 may be brought into closed position on the bowl 12 by a rotative securement device 81, for example of the bayonet type, provided between the flange 33 and the internal surface 38 of the bowl 12, and whose operation of the motor unit is subject to the correct closing of said cover 14. To this end, as illustrated by phantom lines in FIG. 1, the base 10 of the apparatus carries a projection 82 which is adjacent the bowl 12 and which contains a switch 84 to control the motor unit, actuable by a tongue 86 secured to the cover.

As shown in FIGS. 4 and 5, the safety device between the cover and the sieve comprises a latch 88 which is movably mounted on the cover 14, about a horizontal axis 90, under the influence of a spring 92 and which comprises a downwardly extending finger 94 which is vertically displaceable, this finger 94 being adapted to occupy either an "inactive" position (FIG. 4) in which it permits correct closing of the cover and thus the actuation of the switch 84 by the tongue 86 to electrically closed position, and into which it is moved by its end which bears on the external surface 73 of the upper side 74 of frame 25 of sieve 24 inserted in opening 26, and which, during rotation of the cover, slides on said edge until it comes to rest on the upper edge 64 of the receptacle, or an "active" position (FIG. 5) in which it prevents the correct closing of the cover and thus the actuation of switch 84, and in which, in the absence of sieve 24 in opening 26, it abuts against one of the lateral edges 38 of the opening 26 and into which it is also urged by the spring 92.

To produce, for example, raspberry or blueberry juice, there is inserted in the opening 26 the sieve 24 comprises the filter having holes of 0.8 mm; cover 14 is placed on receptacle 12 and turned so as to ensure its securement and the operation of switch 84, at the end of movement of the cover; raspberries, for example, are introduced into the inlet 30, which then fall on the disc 42 of the mashing tool and which are driven in rotation in the bowl 12 by the blades 44.

Thanks to the action of said blades and under the influence of centrifugal force (the speed of rotation of the output shaft 18 having a value between 300 and 600 revolutions per minute), the raspberries are moved into the corners formed between the frontal surface of each blade and the internal surface 38 of the lateral wall, and accumulate in the region of the pressure crown, which has the effect of compressing and grinding them. In the course of this grinding, the raspberry seeds are crushed by the cutting effect obtained between the free edge of the blade and the ridges 59 of the depressions 58. Finally this ground mass is moved to the sieve 24 and is pressed through the holes 78 thereby producing raspberry juice which flows off by the trough 27. It will be noted that in the course of operation, no jamming of the blade results thanks to the existence of the space 52 which also ensures a laminating effect during each cycle of rotation of a blade. To avoid a certain splashing due to the compression and high flow rate through the filter, the trough is provided with a removable guard 96 pivotally mounted about a horizontal axis.

During these preparations of juice, it has been found that it was very difficult to achieve, at low cost, sealing at the level of the pressure crown, between the cover 14 and the bowl 12. This is why the invention provides, between the flange 33 and the external wall of the inlet 30 and with the upper surface of the ring 34, an annular gutter 100 for collecting overflowing juice, this gutter 100 having a series of holes 102 emptying into the interior of the inlet 30.

We claim:

1. Apparatus for grinding and straining food products such as fruits or vegetables so as to reduce them to a puree and comprising a working receptacle which comprises a bottom wall and a side wall which are figures of rotation having a vertical axis and comprising a sieve through which interior of the receptacle communicates with the exterior, the lower region of said sieve being located adjacent said bottom wall, and which encloses a mashing tool secured for rotation to a rotatable shaft disposed on said vertical axis and driven by a motor unit, said mashing tool comprising at least one blade having a frontal attack surface which is disposed transversely to the direction of rotation and is located between the internal surface of the side wall and the rotatable shaft, so as to form with the internal surface of the side wall, at least in the region of the end of said frontal surface and substantially over all the height of the sieve, a corner at an acute angle which opens in the direction of rotation, and whose end free edge extends parallel and in proximity to the internal surface of said side wall thereby leaving a small gap between said edge and said internal surface, said receptacle further comprising a counter-wall which is removably mounted on the side wall and transversely to the vertical axis, and which is disposed above the blade, adjacent the upper edge of said blade so as to leave a small gap between itself and said upper edge, said counted-wall being formed by a ring having a central opening and carrying on its inner edge a downwardly extending skirt which extends over only a portion of the height of the receptacle, so as to form a pressure crown between said skirt and the internal surface of the side wall, while the blade comprises an internal edge of which one portion extends at least the length of said skirt.

2. Apparatus according to claim 1, wherein said receptacle has a removable cover which comprises an inlet for introduction of the food products and an outlet that empties centrally into said receptacle, said counter-wall comprising a transverse wall of the cover extending between the outlet of the inlet and the peripheral edge of said cover.

3. Apparatus according to claim 2, wherein said cover is disposed inside of the bowl, the peripheral edge of said cover has a flange directed upwardly so as to provide, between the internal surface of this flange and the external wall of the inlet as well as with the upper surface of the ring, an annular gutter to collect overflow of juice passing between the external surface of the side wall and the external surface of said flange, this gutter having a series of holes emptying into the interior of the receptacle.

4. Apparatus according to claim 2, in which said sieve is constituted by a screen secured to a frame, and is removably mounted in an opening which is provided in the side wall of the receptacle, said screen extending in height substantially between the counter-wall and the bottom wall of the receptacle, said cover being adapted to be brought into closed position on said receptacle by rotation, the operation of the motor being controlled by at least one switch whose actuation is subject to the correct closure of the cover, the cover and said sieve being mutually provided with a safety device adapted to prevent the operation of the motor unit when said sieve is not in place, said safety device comprising a latch having a finger which is movably mounted on the cover in a vertical direction and which may occupy, either an inactive position in which it permits the correct closing of the cover and thus the actuation of the switch to close it electrically, and in which it is maintained by an end of the cover which rests and slides on the upper side of the frame of the sieve inserted in the opening of the side wall, or an active position in which it prevents the correct closure of the cover and thus the actuation of the switch and in which, in the absence of a sieve in the opening, it comes into contact with one of the side edges of said opening.

5. Apparatus according to claim 4, which has a set of sieves constituted by screens of different fineness, each made of perforated sheet metal whose perforations are formed by cylindrical holes disposed in diagonal formation and of which the ratio of the surface of the holes to the total surface of the filter is comprised between 25 and 60%.

6. Apparatus according to claim 5, wherein the set of sieves comprises at least three screens, namely, a fine screen whose holes have a diameter of about 0.8 mm and of which said ratio is about 25%; a medium screen whose holes have a diameter of about 1.5 mm and of which said ratio is about 50%; and a coarse filter whose holes have a diameter of about 4 mm and of which said ratio is between 55 and 60%.

7. Apparatus for grinding and straining food products such as fruits or vegetables so as to reduce them to a puree and comprising a working receptacle which comprises a bottom wall and a side wall which are figures of rotation having a vertical axis and comprising a sieve through which the interior of the receptacle communicates with the exterior, the lower region of said sieve being located adjacent said bottom wall, and which encloses a mashing tool secured for rotation to a rotatable shaft disposed on said vertical axis and driven by motor unit, said mashing tool comprising at least on blade having a frontal attack surface which is disposed transversely to the direction of rotation and is located between the internal surface of the side wall and the rotatable shaft, so as to form with the internal surface of the side wall, at least in the region of the end of said frontal surface and substantially over all the height of the sieve, a corner at an acute angle which opens in the direction of rotation, and whose end free edge extends parallel and in proximity to the internal surface of said side wall thereby leaving a small gap between said edge and said internal surface, said receptacle further comprising a counter-wall which is removably mounted on the side wall and transversely to the vertical axis, and which is disposed above the blade, adjacent the upper edge of said blade so as to leave a small gap between itself and said upper edge, said counter-wall being formed by a ring having a central opening, a cover for the receptacle, said cover having an inlet that extends down into the receptacle and that is spaced inwardly from said side wall, said ring extending radially outwardly from an external wall of the inlet and having at its outer periphery a flange which is directed upwardly and which provides, between an internal surface of said flange and said external wall of the inlet and above the upper surface of said ring, an annular gutter to collect overflow of juice passing between the external surface of the side wall and the internal surface of said flange, said gutter having a series of holes emptying into interior of the receptacle.

* * * * *